US012704757B2

(12) United States Patent
Cheng et al.

(10) Patent No.: US 12,704,757 B2
(45) Date of Patent: Aug. 11, 2026

(54) ELECTROCHROMIC DEVICE AND ELECTROCHROMIC METHOD THEREFOR

(71) Applicant: SHENZHEN GUANGYI TECH CO., LTD., Shenzhen (CN)

(72) Inventors: Qiao Cheng, Shenzhen (CN); Jiazhi He, Shenzhen (CN); Chaoyue Cao, Shenzhen (CN)

( * ) Notice: Subject to any disclaimer, the term of this patent is extended or adjusted under 35 U.S.C. 154(b) by 712 days.

(21) Appl. No.: 17/798,516

(22) PCT Filed: Mar. 29, 2021

(86) PCT No.: PCT/CN2021/083600
§ 371 (c)(1),
(2) Date: Aug. 9, 2022

(87) PCT Pub. No.: WO2021/197268
PCT Pub. Date: Oct. 7, 2021

(65) Prior Publication Data
US 2023/0063383 A1 Mar. 2, 2023

(30) Foreign Application Priority Data
Apr. 1, 2020 (CN) ......................... 202010249974.9

(51) Int. Cl.
*G02F 1/1514* (2019.01)
*G02F 1/1516* (2019.01)
*G02F 1/163* (2006.01)

(52) U.S. Cl.
CPC ........ *G02F 1/1514* (2019.01); *G02F 1/15165* (2019.01); *G02F 1/163* (2013.01)

(58) Field of Classification Search
CPC ..... G02F 1/1514; G02F 1/15165; G02F 1/163
See application file for complete search history.

(56) References Cited

U.S. PATENT DOCUMENTS 4,715,691 A * 12/1987 Sata ...................... G02F 1/1525 359/267
5,260,821 A * 11/1993 Chu ........................ G02F 1/155 359/269

(Continued)

FOREIGN PATENT DOCUMENTS

CN 105229526 A 1/2016
CN 105278198 A 1/2016

(Continued)

OTHER PUBLICATIONS

Internation Search Report with English Translation and Written Opinion for PCT Application No. PCT/CN2021/083600, dated Jun. 17, 2021, 10 pages.

(Continued)

*Primary Examiner* — George G. King
(74) *Attorney, Agent, or Firm* — TechLaw Ventures, PLLC; Terrence J. Edwards

(57) ABSTRACT

An electrochromic device and an electrochromic method therefor are disclosed. The electrochromic device comprises a first substrate, a first transparent conductive layer, a first electrochromic layer, an electrolyte layer, a second electrochromic layer, a second transparent conductive layer, and a second substrate which are sequentially stacked. Both the first electrochromic layer and the second electrochromic layer are made of a cathode electrochromic material or made of an anodic electrochromic material. The electrochromic method for the electrochromic device comprises: circularly applying a voltage having a direction opposite to and same (Continued)

as that of a first voltage to a pretreated electrochromic device. Because a structure in which two layers of electrochromic layers are made of the anodic electrochromic material or the cathode electrochromic material is used, and a specific electrochromic method is combined, the switching between different colors can be performed, and a selection range of the electrochromic materials can be expanded.

15 Claims, 1 Drawing Sheet

(56) References Cited

U.S. PATENT DOCUMENTS

| | | | | |
|---|---|---|---|---|
| 6,211,995 | B1 | 4/2001 | Azens et al. | |
| 2003/0174377 | A1 * | 9/2003 | Reynolds | C08G 61/126 359/265 |
| 2009/0242113 | A1 * | 10/2009 | Radmard | G02F 1/15165 156/275.5 |
| 2014/0205746 | A1 | 7/2014 | Choi et al. | |

FOREIGN PATENT DOCUMENTS

| | | | |
|---|---|---|---|
| CN | 107922829 | A | 4/2018 |
| CN | 208488635 | U | 2/2019 |
| CN | 110109311 | A | 8/2019 |
| CN | 110658660 | A | 1/2020 |
| CN | 110928095 | A | 3/2020 |
| KR | 20170140388 | A | 12/2017 |
| KR | 20180122132 | A | 11/2018 |

OTHER PUBLICATIONS

First Office Action for Chinese Application No. 202010249974.9, dated Apr. 18, 2022, 10 pages.

Fang Xu et al., Organic Electronics 65 (2019) 8-14 "A new strategy to fabricate multicolor electrochromic device with UV-detecting performance based on TiO2 and PProDOT-Me2" (7 pages).

Kai Sheng et al., Electrochemistry Communications 111 (2020) 106646 "Electrocatalytic PProDOT-Me2 counter electrode for a Br−/Br3− redox couple in a WO3-based electrochromic device" (6 pages).

* cited by examiner

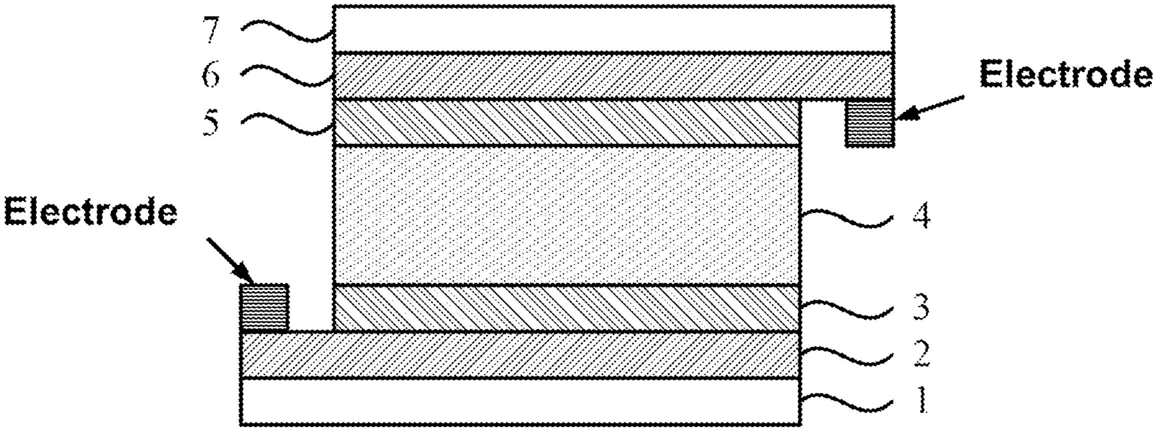
7
6
5
Electrode
Electrode
4
3
2
1

ELECTROCHROMIC DEVICE AND ELECTROCHROMIC METHOD THEREFOR

CROSS-REFERENCE TO RELATED APPLICATION(S)

This present application is a national stage application of International Patent Application No. PCT/CN2021/083600, filed Mar. 29, 2021, which claims priority to Chinese Patent Application No. 202010249974.9, filed Apr. 1, 2020, the disclosures of which are hereby incorporated by reference in their entireties.

TECHNICAL FIELD

The present application belongs to the technical field of color-changing devices, and particularly relates to an electrochromic device and an electrochromic method therefor.

BACKGROUND

Electrochromism refers to the phenomenon that the optical properties of materials undergo stable and reversible color-changing under the action of an external electric field, manifesting a reversible change in color and transparency externally. Materials with the electrochromic property are called electrochromic materials, and the devices made of electrochromic materials are called electrochromic devices. The electrochromic device has important application potential in the fields of color-changing glasses, electronic displays, military concealment, energy conservation in building, etc.

The existing electrochromic device generally adopts a stacked structure of conductive layer-electrochromic layer-electrolyte layer-ion storage layer (electrochromic layer)-conductive layer. In the structure, the electrochromic layer is one of the core components of the electrochromic device, and the electrochromic materials constituting the electrochromic layer can be divided into inorganic electrochromic materials and organic electrochromic materials. Inorganic electrochromic materials have the advantages of stability and fast response, such as tungsten trioxide ($WO_3$), vanadium pentoxide ($V_2O_5$), nickel oxide (NiO) and titanium dioxide ($TiO_2$). Organic electrochromic materials have lots of types, and rich colors and design convenience, such as viologen and polythiophene. Electrochromic materials can also be divided into cathodic electrochromic materials and anodic electrochromic materials according to color changes. Cathodic electrochromic materials can gain electrons to undergo a reduction reaction, switching colors between coloration and discoloration; anodic electrochromic materials can lose electrons to undergo an oxidation reaction, switching colors between coloration and discoloration.

Currently, most electrochromic devices have complex manufacturing process and few color changes, hardly satisfying the requirements on multi-color display and personalized customization. In order to realize the color switching of electrochromic devices, cathodic electrochromic materials and anodic electrochromic materials that can match each other in color change are used to assemble electrochromic devices in the prior art. For example, a cathodic electrochromic material with a color-change range of red to colorless and an anodic electrochromic material with a color-change range of colorless to blue are selected to assemble the device, so as to realize switching between red and blue for the electrochromic device.

CN 105278198A discloses a complementary inorganic all-solid electrochromic device and a preparation method thereof. The device includes a substrate, a transparent conductive layer, an anode electrochromic layer, an ion storage layer, a fast ion transport layer, a cathode electrochromic layer and a transparent conductive layer sequentially arranged from bottom to top. CN 105607375A discloses an electrochromic device for high-throughput screening of solid inorganic electrochromic materials and a preparation method thereof, in which each electrochromic device unit is sequentially plated with a cathode electrochromic layer, a solid electrolyte layer, an anode electrochromic layer and an upper transparent layer from the inside to the outside from a lower transparent conductive layer. CN 110109311A discloses an all-solid electrochromic device and a preparation method thereof. The device is composed of a substrate A, a transparent conductive layer A, an anode electrochromic layer, a solid electrolyte layer, a cathode electrochromic layer, a transparent conductive layer B and a substrate B arranged sequentially. The cathode electrochromic layer is a tungsten oxide film doped with metal atoms, and the anode electrochromic layer is a nickel oxide film doped with metal atoms. These electrochromic devices all use a structure in which a cathode electrochromic layer and an anode electrochromic layer are combined.

However, due to the limited variety of electrochromic materials at present, it may be difficult to find a cathodic electrochromic material (or an anodic electrochromic material) that matches the color of an anodic electrochromic material (or a cathodic electrochromic material), thus requiring an independent design and development; besides, the material with color matched may all belong to anodic electrochromic materials or cathodic electrochromic materials. As a result, the electrochromic device with the above-mentioned structure is usually limited by color, material or process in practical applications, and it is difficult to extend to switching between more colors.

SUMMARY

The present application provides an electrochromic device and an electrochromic method therefor. The electrochromic device adopts a structure in which two electrochromic layers are both an anodic electrochromic material or both are a cathodic electrochromic material, and combined with a specific electrochromic method, the electrochromic device realizes switching between different colors, extending the selection range of electrochromic materials, and it can be easily extended to a mutual switching of more colors, satisfying the requirements on multi-color display and personalized customization.

In a first aspect, the present application provides an electrochromic device, and the electrochromic device includes a first substrate, a first transparent conductive layer, a first electrochromic layer, an electrolyte layer, a second electrochromic layer, a second transparent conductive layer and a second substrate stacked in sequence;

wherein, a material of the first electrochromic layer and a material of the second electrochromic layer are both a cathodic electrochromic material or both an anodic electrochromic material.

The two electrochromic layers of the electrochromic device provided in the present application both use a cathodic electrochromic material or an anodic electrochromic material, and combined with a specific electrochromic method, the electrochromic device can switch between different colors, so that the material of the two electrochromic layers is unnecessarily limited to the combination of cathodic electrochromic materials and anodic electrochromic materials, extending the selection range of electrochromic materials.

In an embodiment of the present application, the first transparent conductive layer and the second transparent conductive layer are each independently formed by at least one of indium tin oxide (ITO), aluminum zinc oxide (AZO), fluorine doped tin oxide (FTO), silver nanowires, graphene, carbon nanotubes, a metal mesh and silver nanoparticles.

In an embodiment of the present application, a thickness of the first transparent conductive layer and a thickness of the second transparent conductive layer are each independently 1-1000 nm, for example, may be 1 nm, 2 nm, 5 nm, 8 nm, 10 nm, 15 nm, 20 nm, 25 nm, 50 nm, 70 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm or 1000 nm, etc.

In the art, a cathodic electrochromic material includes a cathodic electrochromic reduction-state-coloring material, a cathodic electrochromic oxidation-state-coloring material and a cathodic electrochromic multicolor material.

An anodic electrochromic material includes an anodic electrochromic reduction-state-coloring material, an anodic electrochromic oxidation-state-coloring material and an anodic electrochromic multicolor material.

As used herein, the cathodic electrochromic reduction-state-coloring material is colorless in the initial state, and becomes colored in the electron-gaining reduction state; such material includes $TiO_2$, $WO_3$, $Nb_2O_5$, $MoO_3$, $Ta_2O_5$, viologen and its derivatives, etc.

The cathodic electrochromic oxidation-state-coloring material is colored in the initial state, and becomes colorless in the electron-gaining reduction state; such material includes Prussian blue and its derivatives, ruthenium purple and its derivatives, etc.

A color change of the cathodic electrochromic multicolor material can be a plurality of color changes, and for example, the initial state is Color a, the electron-gaining intermediate state is Color b, and the electron-gaining reduction state becomes Color c; or the color change can be a two-color change, and for example, the initial state is Color a', and the electron-gaining reduction state becomes Color c'; such material includes $CoO_x$, $Rh_2O_3$, ferrocene and its derivatives, etc.

The anodic electrochromic reduction-state-coloring material is colored in the initial state, and becomes colorless in the electron-losing oxidation state; such material includes polythiophene and its derivatives, etc.

The anodic electrochromic oxidation-state-coloring material is colorless in the initial state, and becomes colored in the electron-losing oxidation state; such material includes NiO, $IrO_2$, polytriphenylamine and its derivatives, etc.

A color change of the anodic electrochromic multicolor material can be a plurality of color changes, and for example, the initial state is Color d, the electron-losing intermediate state is Color e, and the electron-losing oxidation state becomes Color f; or the color change can be a two-color change, and for example, the initial state is Color d', and the electron-losing oxidation state becomes Color f'; such material includes $V_2O_5$, $MnO_2$, polyaniline and its derivatives, polypyrrole and its derivatives, etc.

The materials of the first electrochromic layer and the second electrochromic layer of the electrochromic device provided in the present application can be selected from any one of the cathodic electrochromic reduction-state-coloring material, the cathodic electrochromic oxidation-state-coloring material and the cathodic electrochromic multicolor materials, respectively; the materials of the first electrochromic layer and the second electrochromic layer can also be selected from any one of the anodic electrochromic reduction-state-coloring material, the anodic electrochromic oxidation-state-coloring material and the anodic electrochromic multicolor material, respectively. Combined with a specific electrochromic method, the electrochromic device can realize switching between different colors. According to the color requirement of the terminal products, different materials can be matched and combined.

In an embodiment of the present application, the material of the first electrochromic layer and the material of the second electrochromic layer are non-simultaneously selected from a cathodic electrochromic multicolor material, and are non-simultaneously selected from an anodic electrochromic multicolor material.

In an embodiment of the present application, neither the material of the first electrochromic layer nor the material of the second electrochromic layer is selected from a cathodic electrochromic multicolor material, and neither of them is selected from an anodic electrochromic multicolor material.

Due to the material selection and color matching of the cathodic electrochromic multicolor material and the anodic electrochromic multicolor material are complex, when the terminal products require the electrochromic device switching between two color states, it is preferred to use the cathodic electrochromic reduction-state-coloring material, the cathodic electrochromic oxidation-state-coloring material, the anodic electrochromic reduction-state-coloring material and the anodic electrochromic oxidation-state-coloring material. It should be understood that, under this circumstance, it is not excluded to use the cathodic electrochromic multicolor material and the anodic electrochromic multicolor material.

In an embodiment of the present application, the material of the first electrochromic layer and the material of the second electrochromic layer are both a cathodic electrochromic reduction-state-coloring material, both a cathodic electrochromic oxidation-state-coloring material, both an anodic electrochromic reduction-state-coloring material, or both an anodic electrochromic oxidation-state-coloring material. For the resulting electrochromic device which is subjected to pretreatment and a forward voltage, one of the two electrochromic layers (Layer A) is colored, and the other layer (Layer B) is colorless; after a reverse voltage is applied, one layer (Layer A) is switched to colorless, and the other layer (Layer B) is switched to colored; the color can be switched between the two colors.

In the present application, the materials of the two electrochromic layers can also be that one is a cathodic electrochromic reduction-state-coloring material, and the other is a cathodic electrochromic oxidation-state-coloring material; or one is an anodic electrochromic reduction-state-coloring material, and the other is an anodic electrochromic oxidation-state-coloring material. The color of the resulting electrochromic device can be switched between colorless and an overlay color of the two electrochromic layers.

In an embodiment of the present application, the material of the first electrochromic layer and the material of the second electrochromic layer are not the same material. Specifically, under the circumstance that the materials of the two electrochromic layers are both a cathodic electrochromic reduction-state-coloring material, for example, the material of the first electrochromic layer and the material of the second electrochromic layer are preferably two materials selected from the cathode electrochromic reduction-statecoloring materials, separately. If the first electrochromic layer and the second electrochromic layer use the same material, the electrochromic device will not exhibit any color switching effect with forward and reverse voltages applied. Therefore, the material of the first electrochromic layer and the material of the second electrochromic layer are preferably different materials.

In an embodiment of the present application, a maximum charge transfer number per unit area of the first electrochromic layer is 0-35 $C/cm^2$ excluding 0, for example, may be 0.05 $C/cm^2$, 0.1 $C/cm^2$, 0.5 $C/cm^2$, 1 $C/cm^2$, 2 $C/cm^2$, 5 $C/cm^2$, 8 $C/cm^2$, 10 $C/cm^2$, 12 $C/cm^2$, 15 $C/cm^2$, 18 $C/cm^2$, 20 $C/cm^2$, 22 $C/cm^2$, 25 $C/cm^2$, 28 $C/cm^2$, 30 $C/cm^2$, 32 $C/cm^2$ or 35 $C/cm^2$, etc.; a maximum charge transfer number per unit area of the second electrochromic layer is 0-35 $C/cm^2$ excluding 0, for example, may be 0.05 $C/cm^2$, 0.1 $C/cm^2$, 0.5 $C/cm^2$, 1 $C/cm^2$, 2 $C/cm^2$, 5 $C/cm^2$, 8 $C/cm^2$, 10 $C/cm^2$, 12 $C/cm^2$, 15 $C/cm^2$, 18 $C/cm^2$, 20 $C/cm^2$, 22 $C/cm^2$, 25 $C/cm^2$, 28 $C/cm^2$, 30 $C/cm^2$, 32 $C/cm^2$ or 35 $C/cm^2$, etc.

In an embodiment of the present application, a ratio of the maximum charge transfer number per unit area of the first electrochromic layer to the maximum charge transfer number per unit area of the second electrochromic layer is 1:50-50:1, for example, may be 1:50, 1:45, 1:40, 1:35, 1:30, 1:25, 1:20, 1:15, 1:10, 1:8, 1:6, 1:5, 1:3, 1:2, 1:1, 2:1, 3:1, 5:1, 6:1, 8:1, 10:1, 15:1, 20:1, 25:1, 30:1, 35:1, 40:1, 45:1 or 50:1; more preferably, the ratio may be 1:10-10:1.

The maximum charge transfer number per unit area of the electrochromic layer is related to the material type and the thickness of the electrochromic layer. For the electrochromic layer of a certain material, the maximum charge transfer number per unit area increases with the thickness. If the thickness of the first electrochromic layer and the second electrochromic layer is too large, the maximum charge transfer number per unit area will be too large, from which it might be resulted that the color change process has a longer color change duration, incomplete color change and poor color switching effect; if the thickness of the first electrochromic layer and the second electrochromic layer is too small, the maximum charge transfer number per unit area will be too small, which might lead to a lighter color, worse color change effect and short device life. If there is a significant difference of the maximum charge transfer number per unit area between the first electrochromic layer and the second electrochromic layer, the color intensity of the two layers will be different significantly, which also might lead to a poor color switching effect.

In an embodiment of the present application, the electrolyte layer is a gel electrolyte layer, a liquid electrolyte layer or a solid electrolyte layer, more preferably a solid electrolyte layer, and further preferably a solid polymer electrolyte layer.

In an embodiment of the present application, a thickness of the electrolyte layer is 0.1-200 μm; for example, may be 0.1 μm, 0.2 μm, 0.5 μm, 0.8 μm, 1 μm, 2 μm, 5 μm, 8 μm, 10 μm, 20 μm, 30 μm, 40 μm, 50 μm, 60 μm, 70 μm, 80 μm, 90 μm, 100 μm, 110 μm, 120 μm, 130 μm, 150 μm, 160 μm, 180 μm or 200 μm, etc.

There is no special limitation on the types of the electrolyte layer in the present application. Exemplarily, the solid electrolyte layer of the following materials can be selected:

in an embodiment of the present application, the solid electrolyte layer includes neutral organic small molecules, and a percentage by weight of the neutral organic small molecules is less than or equal to 30 wt %, for example, may be 25 wt %, 20 wt %, 15 wt %, 10 wt %, 5 wt %, etc.; a molecular weight of the neutral organic small molecule is less than or equal to 3000, for example, may be 2500, 2000, 1500, 1000, 500, etc.

In an embodiment of the present application, the solid electrolyte layer includes a solid electrolyte polymer, and the solid electrolyte polymer has a plasticized group connected by a covalent bond.

In an embodiment of the present application, the solid electrolyte polymer is a copolymer of a monomer and an ion conducting polymer or a copolymer of an oligomer and an ion conducting polymer, in which the monomer or the oligomer has a plasticizable group on the side chain; furthermore, a composition of the solid electrolyte layer further includes a monomer or an oligomer fragment with a cross-linking group on the side chain.

The term "furthermore" in the present application means that, in the definition hereinbefore, the composition of the solid electrolyte layer preferably includes a monomer or an oligomer with a cross-linking group in their side chain, under the condition of a copolymer of a monomer and an ion conducting polymer or a copolymer of an oligomer and an ion conducting polymer; the term "furthermore" hereinafter has the same interpretation.

The plasticized group and plasticizable group refer to a group that can weaken the interaction between polymers and suppress crystallization of polymers.

In an embodiment of the present application, the solid electrolyte polymer is a plasticized linear polymer and an ion conducting polymer, the two of which are linked by chemical bonds; the plasticized linear polymer has a glass transition temperature of less than −20° C.; furthermore, the composition of the solid electrolyte layer further includes a monomer or a polymer with a cross-linking group on the side chain; the three, including the monomer or the polymer with a cross-linking group on the side chain, the plasticized linear polymer and the ion conducting polymer, are linked by chemical bonds.

In an embodiment of the present application, the solid electrolyte polymer includes a polymer, which has a plasticized group on the side chain and a glass transition temperature of less than −20° C., and an ion conducting polymer, the two of which are linked by chemical bonds; furthermore, the composition of the solid electrolyte layer further includes a monomer or a polymer with a cross-linking group on the side chain; the three, including the monomer or the polymer with a cross-linking group on the side chain, the polymer with a plasticized group on the side chain and a glass transition temperature of less than −20° C. and the ion conducting polymer, are linked by chemical bonds.

In an embodiment of the present application, the solid electrolyte polymer is a brush polymer, in which the brush polymer has a flexible polymer main chain, an ion conducting side chain and an non-miscible phase side chain; furthermore, the composition of the solid electrolyte layer further includes a monomer or a oligomer with a cross-linking group on the side chain, in which the monomer or the oligomer with a cross-linking group on the side chain is linked with the brush polymers by chemical bonds in the form of block copolymerization.

The non-miscible phase side chain of the present application refers to the side chain that highly differs from other side chains or polymers in properties, and cannot be blended effectively; the brush polymer provided in the present application refers to the polymer with a flexible polymer main chain and two types of side chains, in which one type of side chain is used for ion conduction, and the other type refers to other types of side chains which are highly different from ion conducting side chain in properties and cannot be effectively blended. By introducing such non-miscible side chain, the polymer can obtain a reduced crystallization, and be in a random state; therefore, the overall ion conducting ability and transparency of the polymers can be improved.

In an embodiment of the present application, the ion transfer layer is a solid flexible electrolyte layer. A polymer of the solid flexible electrolyte layer can be selected from the four classes of polymers described below.

In the structural formulas of the four classes of polymers described below, x, y and z are each independently selected form an integer more than 0. The rectangle shown in the formulas represents a polymer block with ion conducting function (an ion conducting polymer block), and the oval represents a monomer or a polymer with a side chain including a plasticized group (PR), or a cross-linking group (CL), or a non-miscible group (NM), or an ion conducting group (IC).

(1)

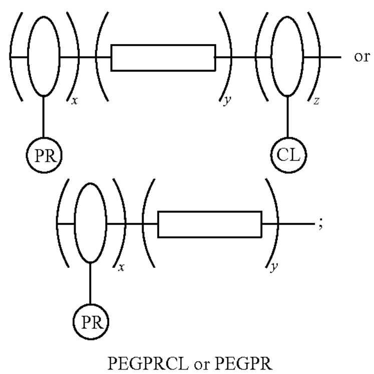

PEGPRCL or PEGPR

The ion conducting polymer block y (such as polyethylene glycol or other materials reported in literature), the monomer or the polymer block x with a plasticized group (PR) on the side chain, and the monomer or the polymer block z with a cross-linking group (CL) on the side chain are copolymerized to form a block copolymer (represented by PEGPRCL). Or the ion conducting polymer block y (such as polyethylene glycol or other materials reported in literature) and the monomer or the polymer block x with a plasticized group (PR) on the side chain are copolymerized to form a block copolymer (represented by PEGPR).

(2)

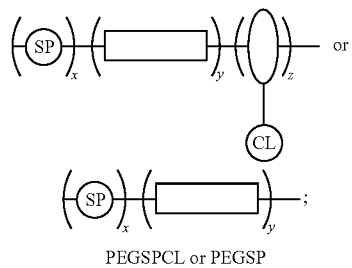

PEGSPCL or PEGSP

The ion conducting polymer block y (such as polyethylene glycol or other materials reported in literature), the plasticized linear polymer (SP) block x with a glass transition temperature of less than −20° C. (such as polyethylene, polybutene, polyisobutylene, siloxane or other materials reported in literature), and the monomer or the polymer block z with a cross-linking group (CL) on the side chain are copolymerized to form a block copolymer (represented by PEGSPCL). Or the ion conducting polymer block y (such as polyethylene glycol or other materials reported in literature) and the plasticized linear polymer (SP) block x with a glass transition temperature of less than −20° C. (such as polyethylene, polybutene, polyisobutylene, siloxane or other materials reported in literature) are linked through chemical reaction to form a block copolymer (represented by PEGSP).

(3)

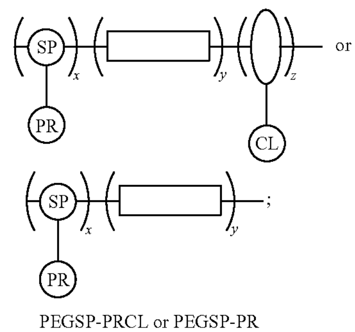

PEGSP-PRCL or PEGSP-PR

The ion conducting polymer block y (such as polyethylene glycol or other materials reported in literature) and the plasticized polymer (SP-PR) block x with plasticized side chain are linked through chemical reaction, and then subjected to copolymerization with the monomer or the oligomer (CL) block z with a cross-linking group on the side chain to form a block copolymer (represented by PEGSP-PRCL). Or the ion conducting polymer block y (such as polyethylene glycol or other materials reported in literature) and the plasticized polymer (SP-PR) block x with a plasticized side chain are linked through chemical reaction to form a block copolymer (represented by PEGSP-PR).

(4)

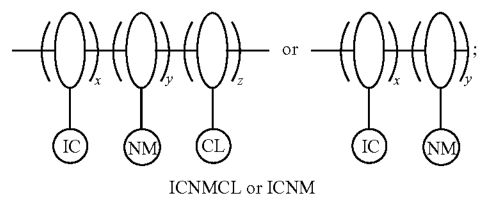

ICNMCL or ICNM

The flexible polymer block x with an ion conducting oligomer or a polymer (such as polyethylene glycol or other materials reported in literature) as the side chain, the flexible polymer block y with a non-miscible side chain (such as an alkyl side chain, an aryl side chain or a side chain of both alkyl and aryl) that is immiscible with ion conducting polymers are linked through chemical reaction, and then subjected to copolymerization with the monomer or the oligomer (CL) block z with a cross-linking group on the side chain to form a brush block copolymers (ICNMCL). Or the flexible polymer block x with an ion conducting oligomer or a polymer (such as polyethylene glycol or other materials reported in literature) as the side chain, and the flexible polymer blocky with a non-miscible side chain (such as an alkyl side chain, an aryl side chain or a side chain of both alkyl and aryl) that are immiscible with ion-conducting polymers as the side chain are linked through chemical reaction to form a brush block copolymer (ICNM).

The polymer materials described above for the ion transfer layer should further be blended with a certain amount of an organic salt and/or an inorganic salt to form an electrolyte precursor. The inorganic salt includes but is not limited to lithium salt, sodium salt, potassium salt, magnesium salt, calcium salt and aluminum salt; the organic salt includes but is not limited to ionic liquid, such as EMITFSI and EMI-OTF. Sometimes, it is also necessary to introduce an initiator for blending to form the electrolyte precursor, and the electrolyte precursor can be cross-linked to form the final all-solid electrolyte by heating, light initiation, etc.

In the present application, the plasticized group (PR) includes but is not limited to the following structure:

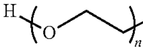

$0 < n < 20$

PEG

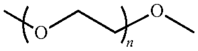

$0 < n < 20$

PEGDME

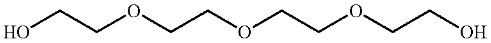

TEG

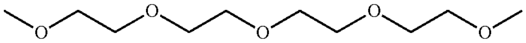

tetraglyme

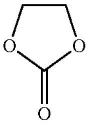

EC

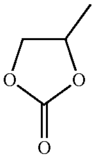

PC

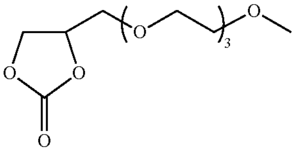

MC3

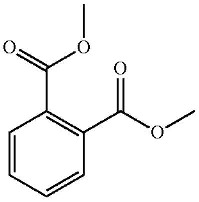

DMP

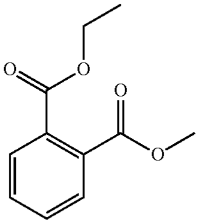

DEP

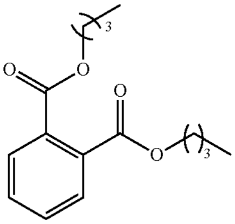

DBP

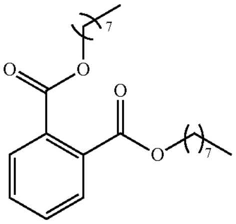

DOP

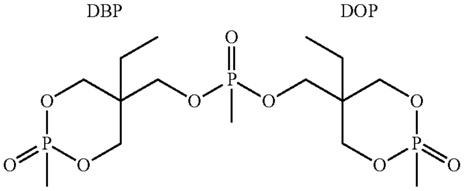

CP

-continued

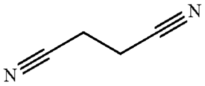

SN

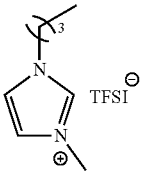

BMITFSI

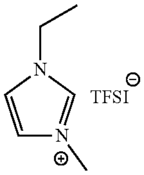

EMITFSI

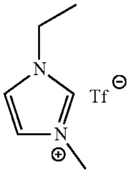

EMITF

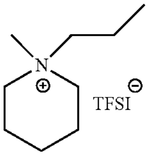

$PP_{13}TFSI$

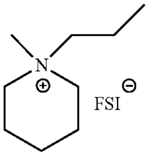

$PP_{13}FSI$

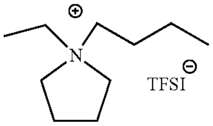

$Pyr_{24}TFSI$

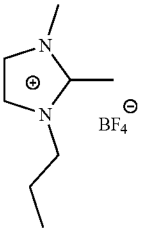

MMPIBF4

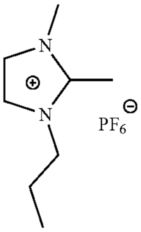

MMPIBF6

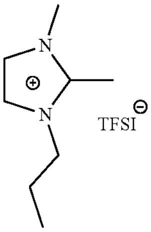

MMPITFSI

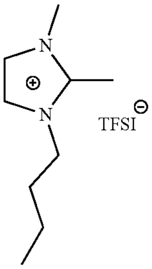

MMBITFSI

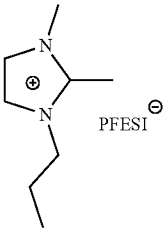

MMPIPFESI

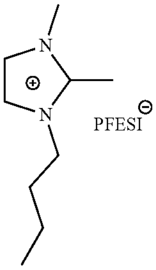

MMBIPFESI

The cross-linking group (CL) includes but is not limited to the following structure:

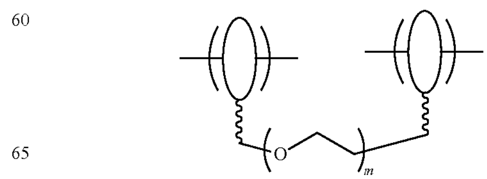

-continued
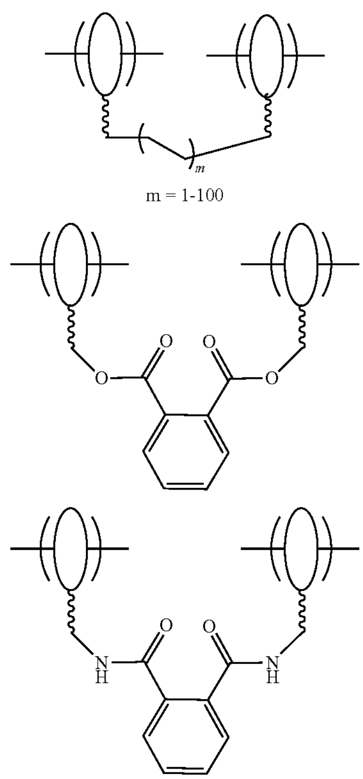
m = 1-100
The main chain of brush block copolymer includes but is not limited to the following structure:
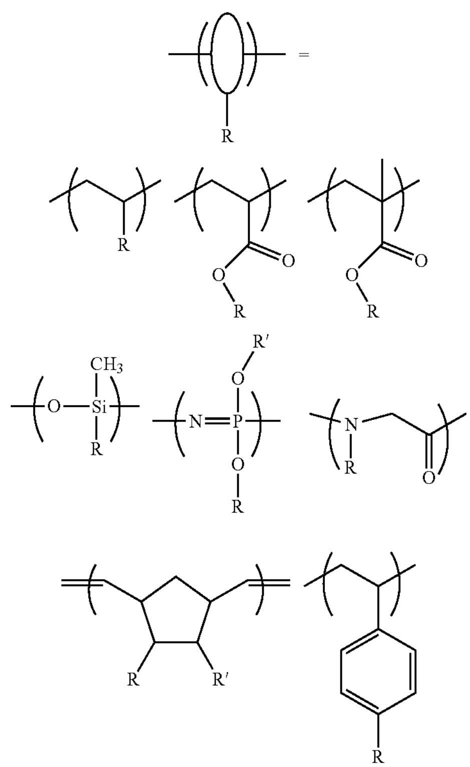
The ion-conducting group (IC) includes but is not limited to the following structure:
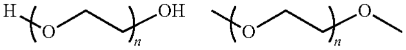
0 < n < 2000
PEG
0 < n < 2000
PEGDME
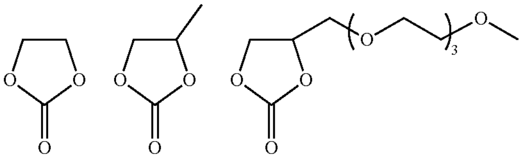
EC PC MC3
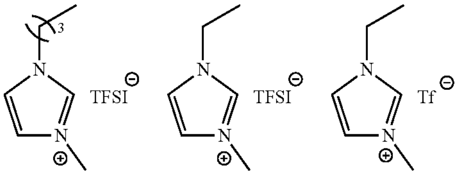
BMITFSI EMITFSI EMITF
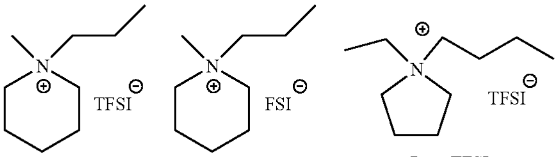
$PP_{13}TFSI$ $PP_{13}FSI$ $Pyr_{24}TFSI$
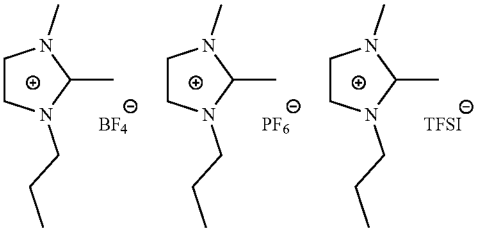
MMPIBF4 MMPIBF6 MMPITFSI
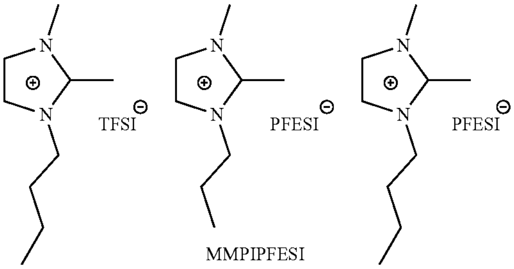
MMPIPFESI
MMBITFSI MMBIPFESI In an embodiment of the present application, a material of the first substrate and a material of the second substrate are each independently selected from glass or a flexible material, preferably a transparent material. The flexible material includes but is not limited to PET (polyethylene terephthalate), a cycloolefin copolymer or cellulose triacetate.

In a second aspect, the present application provides an electrochromic method for the electrochromic device according to the first aspect, and the electrochromic method includes the following steps:

(1) applying a second voltage of a second direction to the electrochromic device after pretreatment, in which the second direction is opposite to a first direction, causing that the first electrochromic layer changes from a third color to a first color, and the second electrochromic layer changes from a second color to a fourth color; the pretreatment includes: applying a first voltage of the first direction to the electrochromic device, causing that the first electrochromic layer changes from the first color to the third color, and the second electrochromic layer keeps the second color unchanged; and (2) applying a third voltage of the first direction to the electrochromic device after pretreatment, causing that the first electrochromic layer changes from the first color to the third color, and the second electrochromic layer changes from the fourth color to the second color.

In the present application, the pretreatment is used to subject the first electrochromic layer to a reversible oxidation/reduction reaction by gaining and losing electrons, so that the color of the first electrochromic layer can be switched; meanwhile, the second electrochromic layer is subjected to a non-Faradaic reaction and partially irreversible electrochemical reaction, and the generated charges facilitate to a charge balance of the electrochromic device, during which time no Faradaic reaction related to color change is performed in the second electrochromic layer, so that the color of the second electrochromic layer remains unchanged. After pretreatment, the electrochromic device can be switched between different colors by applying voltages in opposite directions alternately. And the pretreatment step only needs to be performed when the electrochromic device is used for the first time, while no pretreatment is required for subsequent use. There is no pretreatment step in the prior art for color changes of the electrochromic device. In the present application, by arranging a structure that the two electrochromic layers are both a cathodic electrochromic material or an anodic electrochromic material, and combined with a specific electrochromic method, the electrochromic device provided in the present application can switch between different colors, extending the selection range of electrochromic materials.

In practical uses, the pretreatment can be performed by the manufacturer of the electrochromic device, or by the user during the first utilization, which could be chosen by those skilled in the art according to actual requirements.

It should be noted that, in the present application, a threshold voltage $V_1$ used in the pretreatment step, which changes the first electrochromic layer from the first color to the third color, is higher than a threshold voltage $V_1'$ used in Step (2), which changes the first electrochromic layer from the first color to the third color; therefore, by applying the voltage $V_1'$ to the electrochromic device of the present application according to the existing use method of the electrochromic device, the electrochromic device cannot be subjected to the pretreatment successfully, and thus fail to realize color switching. In the present application, $V_1$ can be measured by gradually increasing the voltage and observing the reversibility of the color change of the first electrochromic layer; or it can be measured from a cyclic voltammetry curve of the electrochromic device.

In an embodiment of the present application, an absolute value of the first voltage is more than or equal to $V_1$, in which $V_1$ is a threshold voltage for subjecting the second electrochromic layer to an irreversible electrochemical reaction.

A high voltage (more than or equal to $V_1$, less than $V_2$) is needed in the pretreatment step of the present application for subjecting the second electrochromic layer to an irreversible electrochemical reaction, in which $V_2$ is the voltage at which the electrochromic device is broken down. If the first voltage is more than $V_2$, a part of the electrochromic layer material will be irreversibly changed, and the structure will be damaged, resulting that the electrochromic device has a degraded quality or even get destroyed.

In an embodiment of the present application, an absolute value of the third voltage is less than the absolute value of the first voltage. During the color switching process, the third voltage is merely used to subject the electrochromic layer material to a reversible electrochemical reaction completely, while is not required to perform an irreversible electrochemical reaction, and thus, this voltage is lower than the voltage required for the pretreatment step.

In a third aspect, the present application provides an electronic terminal, and the electronic terminal includes the electrochromic device according to the first aspect.

The electronic terminal can be consumer electronics, doors and windows, cabinets, electronic labels, wearable devices, smart glasses, phototherapy devices, etc. For example, when the electrochromic device is applied to the electronic terminal, it can be arranged on the surface, interior or any other needed regions of the terminal, exhibiting various effects according to the specific application scenarios, such as appearance diversity, privacy protection, condition display, information distinction, adjustment of ambient brightness, and filtration/transmission of light with different predetermined wavelengths.

Compared with the prior art, the present application has the following beneficial effects.

The two electrochromic layers of the electrochromic device provided in the present application both use a cathodic electrochromic material or an anodic electrochromic material, and combined with a specific electrochromic method, the electrochromic device can switch between different colors, so that the material of the two electrochromic layers is unnecessarily limited to the combination of cathodic electrochromic materials and anodic electrochromic materials, extending the selection range of electrochromic materials. The electrochromic device can be easily extended to switching between more colors, satisfying the requirements on multi-color display and personalized customization.

BRIEF DESCRIPTION OF DRAWINGS

FIG. 1 is a schematic structural diagram of an electrochromic device provided by examples of the present application;

wherein, 1 is a first substrate, 2 is a first transparent conductive layer, 3 is a first electrochromic layer, 4 is an electrolyte layer, 5 is a second electrochromic layer, 6 is a second transparent conductive layer, and 7 is a second substrate.

DETAILED DESCRIPTION

Technical solutions of the present application are further described below with reference to the accompanying drawings and through specific embodiments. It should be apparent to those skilled in the art that the specific embodiments described herein are merely used for a better understanding of the present application, and should not be construed as specific limitations on the present application.

In examples of the present application, preparation methods of the electrolyte polymer composition in an electrolyte layer are described below.

A preparation method of Polymer A (a class of solid electrolyte polymer belonging to PEGPRCL) is described below.

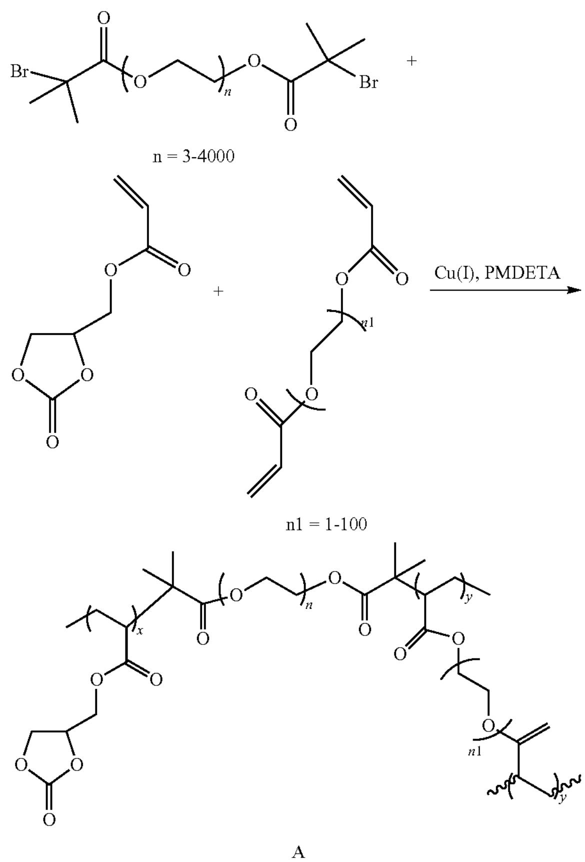

Bromoisobutyric acid-terminated PEG (polyethylene glycol), acrylate with plasticized groups, a cross-linking group with two acrylic acid, a monovalent copper catalyst and a PMDETA (N,N,N',N'',N''-pentamethyldiethylenetriamine) ligand were added in a suitable organic solvent. The mixed solution (the mixture without solvent added could be used for device preparation directly as an electrolyte precursor) was reacted at 100° C. for 12 hours, filtered through celite and subjected to reduced pressure for solvent removal so as to obtain Polymer A.

A preparation method of Polymer B (a class of solid electrolyte polymer belonging to PEGPR) is described below.

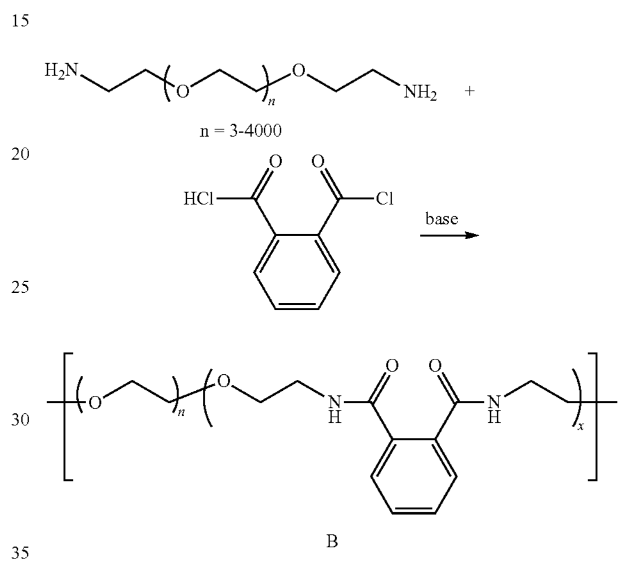

PEG diamine (polyethylene glycol diamine) and phthaloyl chloride were added in a suitable organic solvent, and directly polymerized under an alkaline condition so as to obtain a polymer electrolyte (the mixture without solvent added could be used for device preparation directly as an electrolyte precursor). After water-washing, liquid separation, drying, and solvent-removal, Polymer B was obtained.

A preparation method of Polymer C (a class of solid electrolyte polymer belonging to PEGSPCL) was described below.

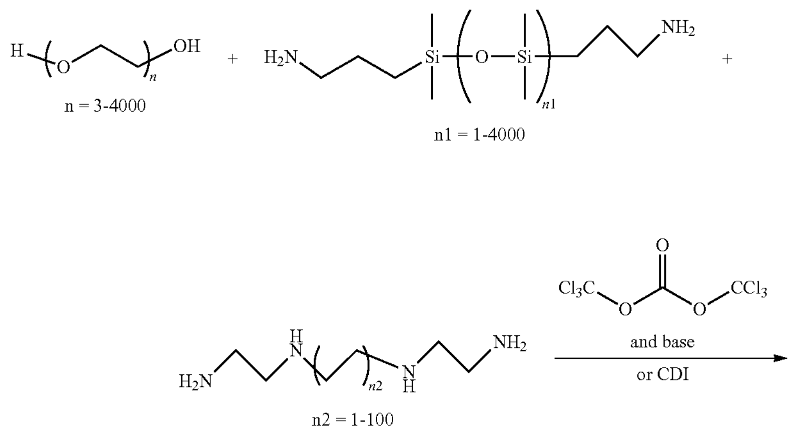

-continued

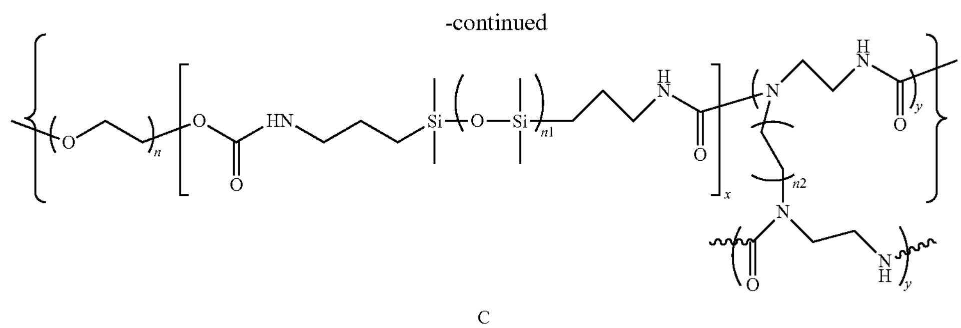

C

PEG (polyethylene glycol), polysiloxane diamine, a tetraamine crosslinking agent and a CDI (carbonyldiimidazole) condensing agent were added in a suitable organic solvent (the mixture without solvent added could be used for device preparation directly as an electrolyte precursor). The mixed solution was reacted at 90° C. to obtain the polymer. After water-washing, liquid separation, drying, and solvent-removal, Polymer C was obtained.

A preparation method of Polymer D (a class of solid electrolyte polymer belonging to PEGSP) was described below.

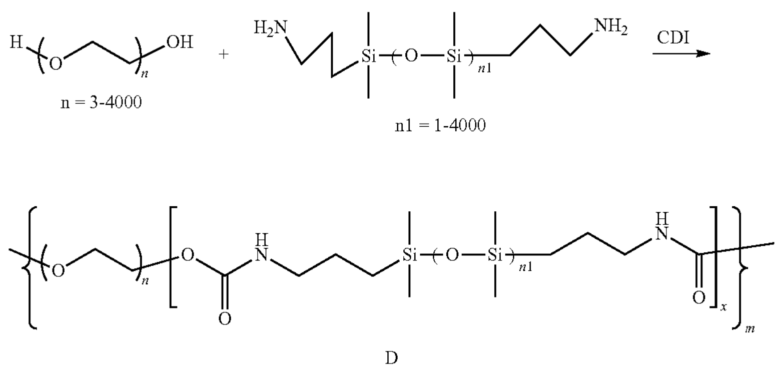

D

PEG (polyethylene glycol), polysiloxane diamine and a CDI (carbonyldiimidazole) condensing agent were added in a suitable organic solvent (the mixture without solvent added could be used for device preparation directly as an electrolyte precursor). The mixed solution was reacted at 120° C. to obtain the polymer, and after water-washing, liquid separation, drying, and solvent-removal, Polymer D was obtained.

A preparation method of Polymer E (a class of solid electrolyte polymer belonging to PEGSP-PRCL) was described below.

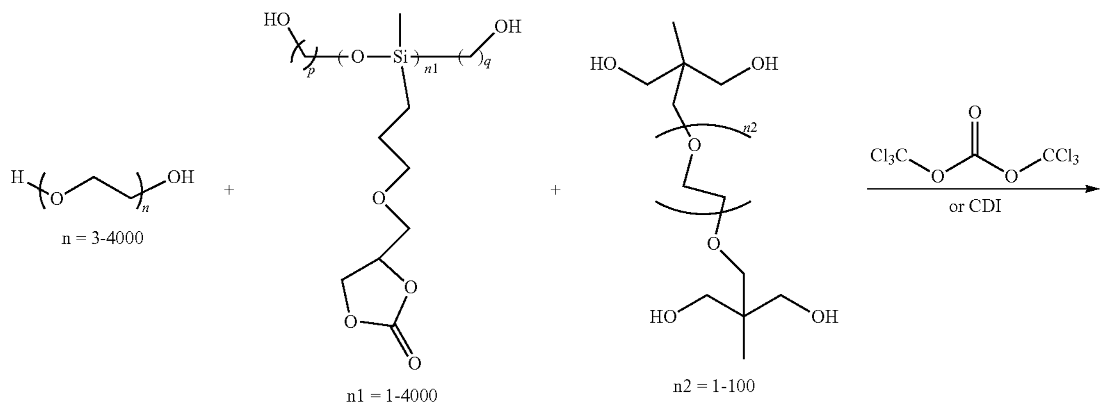

-continued

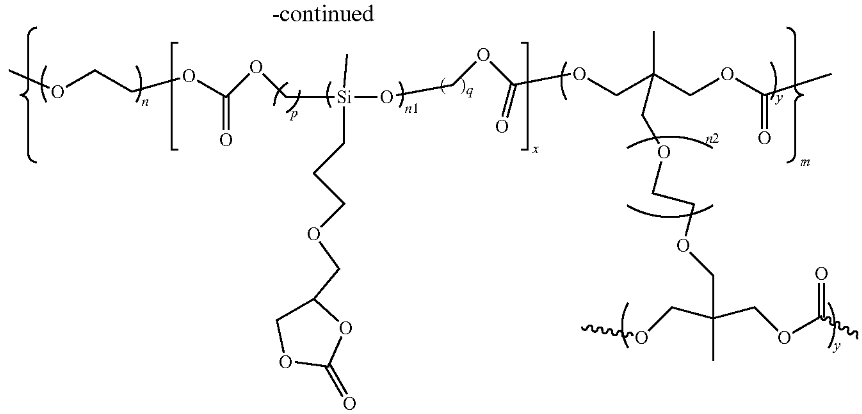

E

PEG (polyethylene glycol), polysiloxane diol, a tetraol crosslinking agent and a CDI (carbonyldiimidazole) condensing agent were added in a suitable organic solvent (the mixture without solvent added could be used for device preparation directly as an electrolyte precursor). The mixed solution was reacted at 100° C. to obtain the polymer. After water-washing, liquid separation, drying, and solvent-removal, Polymer E was obtained.

A preparation method of Polymer F (a class of solid electrolyte polymer belonging to PEGSP-PR) was described below.

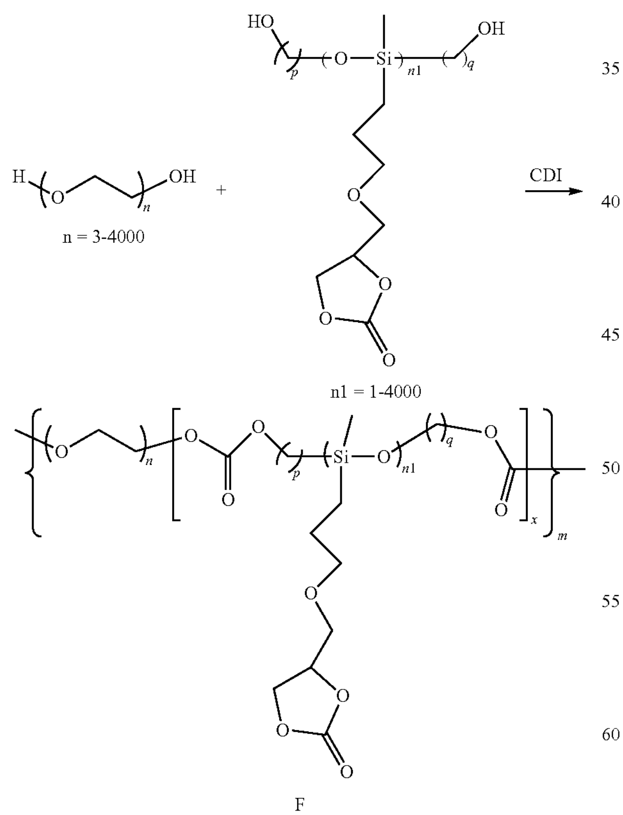

F

PEG (polyethylene glycol), polysiloxane diol, and a CDI (carbonyldiimidazole) condensing agent were added in a suitable organic solvent (the mixture without solvent added could be used for device preparation directly as an electrolyte precursor). The mixed solution was reacted at 100° C. to obtain the polymer. After water-washing, liquid separation, drying, and solvent-removal, Polymer F was obtained.

A preparation method of Polymer G (a class of solid electrolyte polymer belonging to ICNMCL) was described below.

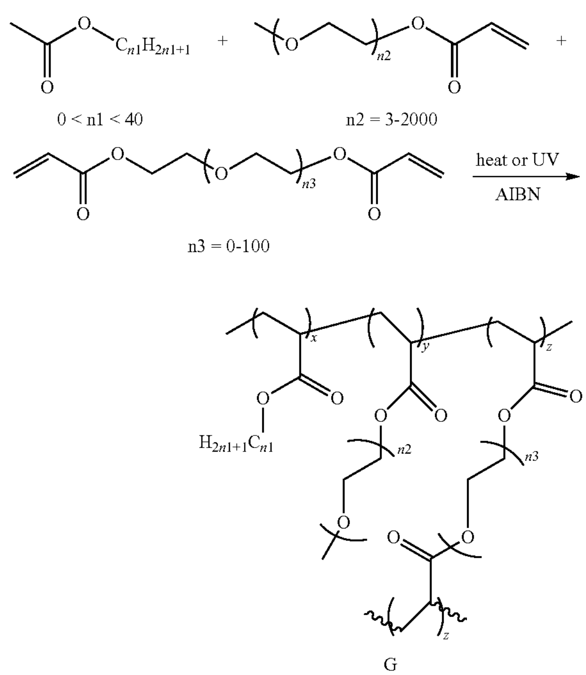

G

Alkyl acrylate, polyethylene glycol acrylate, ethylene glycol diacrylate and AIBN (azobisisobutyronitrile) were added in a suitable organic solvent (the mixture without solvent added could be used for device preparation directly as an electrolyte precursor). The polymer was obtained by photoreaction. After water-washing, liquid separation, drying, and solvent-removal, Polymer G was obtained.

A preparation method of Polymer H (a class of solid electrolyte polymer belonging to ICNM) was described below.

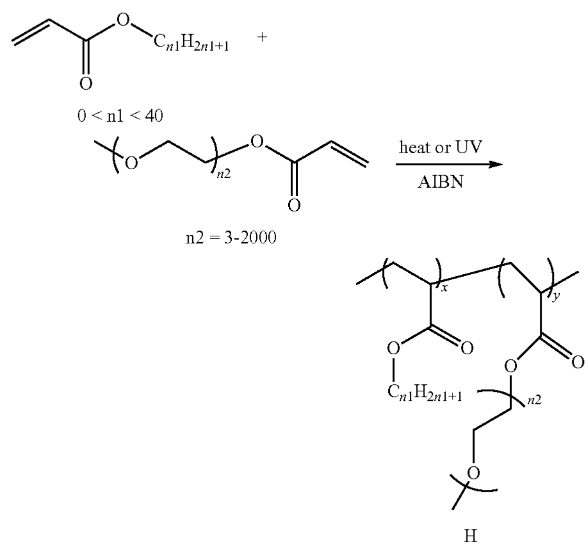

H

Alkyl acrylate, polyethylene glycol acrylate and AIBN (azobisisobutyronitrile) were added in a suitable organic solvent (the mixture without solvent added could be used for device preparation directly as an electrolyte precursor). The polymer was obtained by photoreaction. After water-washing, liquid separation, drying, and solvent-removal, Polymer H was obtained.

It should be noted that, in examples of the present application, when a potential of the first electrochromic layer 3 is higher than a potential of the second electrochromic layer 5, the voltage direction is referred to as a forward direction; when the potential of the first electrochromic layer 3 is lower than the potential of the second electrochromic layer 5, the voltage direction is referred to as a reverse direction.

In examples of the present application, a testing method of the maximum charge transfer number per unit area of an electrochromic layer is as follows:

1. an electrochromic layer to be tested, an Ag/AgCl electrode and a Pt electrode were integrated into a three-electrode system as a working electrode, a reference electrode and a counter electrode, respectively, and an electrolyte solution was a propylene carbonate solution containing 50% lithium perchlorate;
2. the above three-electrode system was subjected to a cyclic voltammetry test by using an electrochemical workstation, in which an initial voltage and a final voltage were set to 0 V, a scan rate was 0.05 V/s, a number of scan cycles was 6, and a sensitivity was e^(−2); a maximum voltage and a minimum voltage were appropriately adjusted according to a material of the electrochromic layer, as long as the electrochromic layer under test gave complete mirror-symmetrical redox peaks during scanning;
3. an area of the cyclic voltammetry curve was integrated, and the result of area integration was denoted as S; and
4. the maximum charge transfer number per unit area was calculated $Q=S/(2\times V\times A)$;

wherein, V was the scan rate during the cyclic voltammetry curve scanning, and A was an area of the electrochromic layer immersed in the electrolyte solution.

Example 1

This example provides an electrochromic device, the schematic structural diagram of which is shown in FIG. 1, including the first substrate 1, the first transparent conductive layer 2, the first electrochromic layer 3, the electrolyte layer 4, the second electrochromic layer 5, the second transparent conductive layer 6 and the second substrate 7 stacked in sequence; in the device, a material of the first electrochromic layer 3 and a material of the second electrochromic layer 5 were both an anodic electrochromic reduction-state-coloring material.

A preparation method of the electrochromic device is described below.

1) Preparation of the First Electrochromic Layer 3:

300 mg of poly-2-[(2-ethylhexyloxy)methyl]3,4-thienol, 4-dioxane was dissolved in 10 mL of o-xylene, and stirred magnetically for 10 h, and then the obtained solution was dropped onto an ITO layer (the first transparent conductive layer 2) deposited on a glass substrate (the first substrate 1), spin-coated, and dried to form the first electrochromic layer 3 (with a thickness of 200 nm). The maximum charge transfer number per unit area of the first electrochromic layer 3 was measured, and the result was 3.3 $C/cm^2$.

2) Preparation of the Second Electrochromic Layer 5:

400 mg of poly(3-hexylthiophene) (P3HT) was dissolved in 10 mL of chloroform, and stirred magnetically for 10 h, and then the obtained solution was dropped onto an ITO layer (the second transparent conductive layer 6) deposited on a glass substrate (the second substrate 7), spin-coated, and dried to form the second electrochromic layer 5 (with a thickness of 300 nm). The maximum charge transfer number per unit area of the second electrochromic layer 5 was measured, and the result was 4.2 $C/cm^2$; a ratio of the maximum charge transfer number per unit area of the first electrochromic layer 3 to the maximum charge transfer number per unit area of the second electrochromic layer 5 was 0.79:1.

3) Assembly of the Electrochromic Device:

10 wt % of lithium perchlorate, 89.9 wt % of Polymer H precursor and 0.1 wt % of azobisisobutyronitrile were mixed and coated on the first electrochromic layer 3, forming an electrolyte coating; then the second electrochromic layer 5 (together with the ITO layer and the glass substrate) was covered on the electrolyte coating in stagger, and the electrolyte coating was subjected to ultraviolet curing to form the electrolyte layer 4 (with a thickness of 50 μm), so as to obtain the electrochromic device.

4) Arrangement of Electrodes:

The materials of the first electrochromic layer 3 and the second electrochromic layer 5, which were exposed in stagger, were washed with acetone, causing that the first transparent conductive layer 2 and the second transparent conductive layer 6 were exposed, and copper tapes were stuck onto the conductive layers as positive and negative electrodes separately.

This example also provides an electrochromic method for the electrochromic device, including the steps described below.

(1) Performing a Pretreatment by Applying a Forward Voltage

The first electrochromic layer 3 was connected to the positive electrode of a power supply, the second electrochromic layer 5 was connected to the negative electrode of the power supply, and a forward voltage (1.8 V) was applied to the device, causing that the first electrochromic layer 3 was oxidized from blue-purple to colorless, while the second electrochromic layer 5 still kept red color. There is no special limitation on the timing of the pretreatment, and the pretreatment can be performed at any time point before the electrochromic device firstly switches between different colors and after the electrode arrangement step of the preparation method.

(2) Switch Between Different Colors

A reverse voltage (−1.0 V) was applied to the electrochromic device, causing that the first electrochromic layer 3 was reduced from colorless to blue-purple, and the second electrochromic layer 5 was oxidized from red to colorless; a forward voltage (0 V) was applied to the electrochromic device, causing that the first electrochromic layer 3 was oxidized from blue-purple to colorless, and the second electrochromic layer 5 was reduced from colorless to red; the reverse voltage (−1.0 V) and the forward voltage (0 V) were applied to the device alternately, causing that the device color was switched between blue-purple and red.

The electrochromic device provided in this example can be used in consumer electronics, electronic labels, doors and windows, cabinets, wearable devices, smart glasses, phototherapy devices and other terminal products. For example, in phototherapy devices, the phototherapy devices can be glasses, helmets, display screens, etc., and the prepared eyeglasses or display screens are used to filter/transmit light of different predetermined wavelengths, and allow the light of specific wavelengths to enter the user's eyes, thereby exhibiting some effects, such as adjusting jet lag, improving sleep quality, relieving fatigue and soothing emotions, etc.

Example 2

This example provides an electrochromic device, the schematic structural diagram of which is shown in FIG. 1, including the first substrate 1, the first transparent conductive layer 2, the first electrochromic layer 3, the electrolyte layer 4, the second electrochromic layer 5, the second transparent conductive layer 6 and the second substrate 7 stacked in sequence; in the device, a material of the first electrochromic layer 3 and a material of the second electrochromic layer 5 were both a cathodic electrochromic oxidation-state-coloring material.

A preparation method of the electrochromic device is described below.

1) Preparation of the First Electrochromic Layer 3

80 mg of potassium ferricyanide was weighed out and dissolved in 25 mL of deionized water, 60 mg of nickel acetate was weighed out and dissolved in 25 mL of deionized water, and the solutions were stirred well. The potassium ferricyanide solution was added to the nickel acetate solution to form a precipitate, and the precipitate was washed three times with water and ethanol, respectively. The precipitate was dried, and 50 mg was weighed out and redispersed in 10 mL of deionized water to form a solution. Then, the obtained solution was dropped onto an ITO layer (the first transparent conductive layer 2) deposited on a glass substrate (the first substrate 1), spin-coated, and dried to form the first electrochromic layer 3 (Prussian blue, with a thickness of 200 nm). The maximum charge transfer number per unit area of the first electrochromic layer 3 was measured, and the result was 8.9 $C/cm^2$.

2) Preparation of the Second Electrochromic Layer 5

Firstly, 50 mL of potassium chloride solution with a concentration of 35 mmol/mL was prepared, and deoxygenated by injecting nitrogen in the form of bubbles. Then 25 mL was taken, and potassium hexacyanoruthenate (II) hydrate was dissolved in the solution. The remaining 25 mL of deoxygenated potassium chloride solution was prepared into a ferric chloride solution of 1 mmol/mL. The obtained two solutions were mixed by stirring rapidly with magnetic stirrer bar to obtain a bright-purple colloidal suspension of ruthenium purple. The obtained colloidal solution was then adjusted to pH=2 with hydrochloric acid. Finally, with nitrogen injected, 1 mL 1 mmol/mL of ruthenium chloride solution was added. Subsequently, the obtained solution was transferred to an electrochemical cell; with ITO (the second transparent conductive layer 6) on a glass substrate (the second substrate 7) as an electrode, and using the cyclic voltammetry method in which potential sweep cycled between −0.2 V and 0.6 V, a ruthenium purple film was electrochemically deposited on the electrode to form the second electrochromic layer 5 (with a thickness of 250 nm). The maximum charge transfer number per unit area of the second electrochromic layer 5 was measured, and the result was 10.2 $C/cm^2$, and a ratio of the maximum charge transfer number per unit area of the first electrochromic layer 3 to the maximum charge transfer number per unit area of the second electrochromic layer 5 was 0.87:1.

3) Assembly of the Electrochromic Device 10 wt % of lithium perchlorate, 89.9 wt % of Polymer G precursor, 40% 40 mmol/mL of KCl solution and 0.1 wt % of azobisisobutyronitrile were mixed and coated on the first electrochromic layer 3, forming an electrolyte coating; then the second electrochromic layer 5 (together with the ITO layer and the glass substrate) was covered on the electrolyte coating in stagger, and the electrolyte coating was subjected to ultraviolet curing to form the electrolyte layer 4 (with a thickness of 10 μm), so as to obtain the electrochromic device.

4) Arrangement of Electrodes

The materials of the first electrochromic layer 3 and the second electrochromic layer 5, which were exposed in stagger, were washed with acetone, causing that the first transparent conductive layer 2 and the second transparent conductive layer 6 were exposed, and copper tapes were stuck onto the conductive layers as positive and negative electrodes separately.

This example also provides an electrochromic method for the electrochromic device, including the steps described below.

(1) Performing a Pretreatment by Applying a Reverse Voltage

A reverse voltage (−1.2 V) was applied to the device, causing that the first electrochromic layer 3 was reduced from dark-blue to colorless, while the second electrochromic layer 5 still kept purple color. There is no special limitation on the timing of the pretreatment, and the pretreatment can be performed when the electrochromic device firstly switches between different colors, or it can be performed immediately after the electrode arrangement step of the preparation method for the electrochromic device.

(2) Switch Between Different Colors

A forward voltage (0.5 V) was applied to the electrochromic device, causing that the first electrochromic layer 3 was oxidized from colorless to dark-blue, and the second electrochromic layer 5 was reduced from purple to colorless; a reverse voltage (−0.5 V) was applied to the electrochromic device, causing that the first electrochromic layer 3 was reduced from dark-blue to colorless, and the second electrochromic layer 5 was oxidized from colorless to purple; the forward voltage (0.5 V) and the reverse voltage (−0.5 V) were applied to the device alternately, causing that the device color was switched between dark-blue and purple.

The electrochromic device provided in this example can be used in consumer electronics, electronic labels, doors and windows, cabinets, wearable devices, smart glasses, phototherapy devices and other terminal products. For example, in consumer electronics, the consumer electronics can be mobile phones, tablets, computers, watches, etc., and the electrochromic device can be applied to the product shells, display screens or any other position, so that the consumer electronics have rich appearance effects, and the device can also be used for achieving the effect of showing different status information according to different color status.

Example 3

This example provides an electrochromic device, the schematic structural diagram of which is shown in FIG. 1, including the first substrate 1, the first transparent conductive layer 2, the first electrochromic layer 3, the electrolyte layer 4, the second electrochromic layer 5, the second transparent conductive layer 6 and the second substrate 7 stacked in sequence; in the device, a material of the first electrochromic layer 3 and a material of the second electrochromic layer 5 were both a cathodic electrochromic reduction-state-coloring material.

The preparation method of the electrochromic device is described below.

1) Preparation of the First Electrochromic Layer 3

100 mg of tungsten powder at 99.9% pure was dissolved in 10 mL of 30 wt % hydrogen peroxide solution, stirred at room temperature for 4 h; after stirring, the precipitate beneath was filtered off, and anhydrous ethanol and acetic acid were added, and stirred continuously for 4 h. Then, the obtained solution was dropped onto an ITO layer (the first transparent conductive layer 2) deposited on a glass substrate (the first substrate 1), spin-coated, and dried at a high temperature of 450° C. to form the first electrochromic layer 3 ($WO_3$, with a thickness of 10 nm). The maximum charge transfer number per unit area of the first electrochromic layer 3 was measured, and the result was 7 $C/cm^2$.

2) Preparation of the Second Electrochromic Layer 5

130 mg of $Nb_2O_5$ powder was dissolved in a mixture of 2.5 mL acetic acid and 12.5 mL butanol, and stirred magnetically for 10 h; then the obtained solution was dropped onto an ITO layer (the second transparent conductive layer 6) deposited on a glass substrate (the second substrate 7), spin-coated, and dried at a high temperature of 700° C. to form the second electrochromic layer 5 (with a thickness of 50 nm). The maximum charge transfer number per unit area of the second electrochromic layer 5 was measured, and the result was 13 $C/cm^2$, and a ratio of the maximum charge transfer number per unit area of the first electrochromic layer 3 to the maximum charge transfer number per unit area of the second electrochromic layer 5 was 0.54:1.

3) Assembly of the Electrochromic Device 10 wt % of lithium perchlorate, 89.9 wt % of Polymer C precursor and 0.1 wt % of carbonyldiimidazole were mixed and coated on the first electrochromic layer 3, forming an electrolyte coating; then the second electrochromic layer 5 (together with the ITO layer and the glass substrate) was covered on the electrolyte coating in stagger, and the electrolyte coating was subjected to heat curing at 90° C. to form the electrolyte layer 4 (with a thickness of 80 μm), so as to obtain the electrochromic device.

4) Arrangement of Electrodes

The materials of the first electrochromic layer 3 and the second electrochromic layer 5, which were exposed in stagger, were washed with acetone, causing that the first transparent conductive layer 2 and the second transparent conductive layer 6 were exposed, and copper tapes were stuck onto the conductive layers as positive and negative electrodes separately.

This example also provides an electrochromic method for the electrochromic device, including the steps described below.

(1) Performing a Pretreatment by Applying a Reverse Voltage

A reverse voltage (−3.0 V) was applied to the device, causing that the first electrochromic layer 3 was reduced from colorless to blue, while the second electrochromic layer 5 still kept colorless. There is no special limitation on the timing of the pretreatment, and the pretreatment can be performed when the electrochromic device firstly switches between different colors, or it can be performed immediately after the electrode arrangement step of the preparation method for the electrochromic device.

(2) Switch Between Different Colors

A forward voltage (1.5 V) was applied to the electrochromic device, causing that the first electrochromic layer 3 was oxidized from blue to colorless, and the second electrochromic layer 5 was reduced from colorless to light-gray; a reverse voltage (−1.5 V) was applied to the electrochromic device, causing that the first electrochromic layer 3 was reduced from colorless to blue, and the second electrochromic layer 5 was oxidized from light-gray to colorless; the forward voltage (1.5 V) and the reverse voltage (−1.5 V) were applied to the device alternately, causing that the device color was switched between light-gray and blue.

The electrochromic device provided in this example can be used in consumer electronics, electronic labels, doors and windows, cabinets, wearable devices, smart glasses, phototherapy devices and other terminal products. For example, in doors and windows, the electrochromic device can be applied to the glass of doors and windows, and the color and transmittance of the glass can be adjusted according to user needs, thereby exhibiting some effects, such as privacy protection, adjustment of ambient brightness, and adjustment of temperature.

Example 4

This example provides an electrochromic device, which differs from Example 1 in that a material of the first electrochromic layer 3 and a material of the second electrochromic layer 5 were both an anodic electrochromic oxidation-state-coloring material, and the raw material constituting the electrolyte layer 4 was replaced with Polymer F;

wherein, the material of the first electrochromic layer 3 was NiO, the film of which was formed by reactively sputtering using Ni as a metal target with a thickness of 90 nm, and the maximum charge transfer number per unit area was 18 $C/cm^2$; the material of the second electrochromic layer 5 was $IrO_2$, the film of which was formed by reactively sputtering using Ir as a metal target with a thickness of 125 nm, and the maximum charge transfer number per unit area was 25 $C/cm^2$; a ratio of the maximum charge transfer number per unit area of the first electrochromic layer 3 to the maximum charge transfer number per unit area of the second electrochromic layer 5 was 0.66:1; the electrolyte layer 4 was prepared by mixing 10 wt % of lithium perchlorate, 89.9 wt % of Polymer F precursor and 0.1 wt % of carbonyldiimidazole and heat-curing at 100° C. with a thickness of 50 μm.

This example also provides an electrochromic method for the electrochromic device, including the steps described below.

(1) Performing a Pretreatment by Applying a Forward Voltage

A forward voltage (3 V) was applied to the device, causing that the first electrochromic layer 3 was oxidized from colorless to brown, while the second electrochromic layer 5 still kept colorless. There is no special limitation on the timing of the pretreatment, and the pretreatment can be performed when the electrochromic device firstly switches between different colors, or it can be performed immediately after the electrode arrangement step of the preparation method for the electrochromic device.

(2) Switch Between Different Colors

A reverse voltage (−1.8 V) was applied to the electrochromic device, causing that the first electrochromic layer 3 was reduced from brown to colorless, and the second electrochromic layer 5 was oxidized from colorless to black-blue; a forward voltage (1.8 V) was applied to the electrochromic device, causing that the first electrochromic layer 3 was oxidized to brown, and the second electrochromic layer 5 was reduced from black-blue to colorless; the reverse voltage (−1.8 V) and the forward voltage (1.8 V) were applied to the device alternately, causing that the device color was switched between black-blue and brown.

The electrochromic device provided in this example can be used in consumer electronics, electronic labels, doors and windows, cabinets, wearable devices, smart glasses, phototherapy devices and other terminal products. For example, in cabinets, the electrochromic device can be applied to the surface or glass of cabinets, exhibiting appearance diversity, privacy protection, adjustment of cabinet temperature, and other effects.

Example 5

This example provides an electrochromic device, which differs from Example 1 in that, during the preparation of the first electrochromic layer 3, 600 mg of poly-2-[(2-ethylhexyloxy)methyl]3,4-thienol,4-dioxane was weighed out, a thickness was 800 nm after spin coating, and the maximum charge transfer number per unit area was 12.2 $C/cm^2$; during the preparation of the second electrochromic layer 5, 50 mg of poly(3-hexylthiophene) (P3HT) was weighed out, a thickness was 12 nm after spin coating, the maximum charge transfer number per unit area was 0.25 $C/cm^2$, and a ratio of the maximum charge transfer number per unit area of the first electrochromic layer 3 to the maximum charge transfer number per unit area of the second electrochromic layer 5 was 48.8:1; the raw material constituting the electrolyte layer 4 was replaced with Polymer B, and the electrolyte layer 4 was prepared by mixing 10 wt % of lithium perchlorate, 89.9 wt % of polymer B precursor and 0.1 wt % potassium hydroxide of 85% for 12 h with a thickness of 50 μm.

A forward voltage (1.8 V) was applied to the electrochromic device provided in this example for pretreatment, and then, a reverse voltage (−1.0 V) and a forward voltage (0.4 V) were applied alternately, causing that the device color was switched between blue-purple and red.

The electrochromic device provided in this example can be used in consumer electronics, electronic labels, doors and windows, cabinets, wearable devices, smart glasses, phototherapy devices and other terminal products. For example, when applied to wearable devices, the electrochromic device can be applied to the shells or display area of the wearable devices, exhibiting appearance diversity, light filtration, and other effects.

Example 6

This example provides an electrochromic device, which differs from Example 1 in that a material of the first electrochromic layer 3 was a cathodic electrochromic reduction-state-coloring material, a material of the second electrochromic layer 5 was a cathode electrochromic oxidation-state-coloring material, and the raw material constituting the electrolyte layer 4 was replaced with Polymer A; and the material of the first electrochromic layer 3 was $WO_3$, a preparation method referred to Example 3, a thickness was 50 nm, and the maximum charge transfer number per unit area was 20 $C/cm^2$; the material of the second electrochromic layer 5 was ruthenium purple, a preparation method referred to Example 2, a thickness was 250 nm, the maximum charge transfer number per unit area was 10.2 $C/cm^2$, and a ratio of the maximum charge transfer number per unit area of the first electrochromic layer 3 to the maximum charge transfer number per unit area of the second electrochromic layer 5 was 1.96:1; the electrolyte layer 4 was prepared by mixing 10 wt % of lithium perchlorate, 89.9 wt % of Polymer A precursor, 0.05 wt % of cuprous chloride and 0.1 wt % N,N,N',N",N"-pentamethyldiethylenetriamine and heat-curing at 100° C. with a thickness of 150 μm.

A reverse voltage (−3 V) was applied to the electrochromic device provided in this example for pretreatment, and then, a forward voltage (1.2 V) and a reverse voltage (−1.5 V) were applied alternately, causing that the device color was switched between colorless and overlay colors (blue and purple).

The electrochromic device provided in this example can be used in consumer electronics, electronic labels, doors and windows, cabinets, wearable devices, smart glasses, phototherapy devices and other terminal products. For example, when applied to electronic labels, the electrochromic device exhibits effects of condition display and information distinction.

Example 7

This example provides an electrochromic device, which differs from Example 1 in that a material of the first electrochromic layer 3 was an anodic electrochromic reduction-state-coloring material, a material of the second electrochromic layer 5 was an anodic electrochromic oxidation-state-coloring material, and the raw material constituting the electrolyte layer was replaced with Polymer E; and the material of the first electrochromic layer 3 was poly-2-[(2-ethylhexyloxy)methyl]3,4-thiophene, a preparation method referred to Example 1, a thickness was 200 nm, and the maximum charge transfer number per unit area was 3.3 $C/cm^2$; the material of the second electrochromic layer 5 was NiO, a preparation method referred to Example 4, a thickness was 180 nm, the maximum charge transfer number per unit area was 32 $C/cm^2$, and a ratio of the maximum charge transfer number per unit area of the first electrochromic layer 3 to the maximum charge transfer number per unit area of the second electrochromic layer 5 was 1:10; the electrolyte layer 4 was prepared by mixing 10 wt % of lithium perchlorate, 89.9 wt % of Polymer E precursor and 0.1 wt % carbonyldiimidazole and heat-curing at 100° C. with a thickness of 30 μm.

A forward voltage (1.8 V) was applied to the electrochromic device provided in this example for pretreatment, and then, a reverse voltage (−1.0 V) and a forward voltage (1 V) were applied alternately, causing that the device color was switched between colorless and overlay colors (brown-black and blue-purple).

The electrochromic device provided in this example can be used in consumer electronics, electronic labels, doors and windows, cabinets, wearable devices, smart glasses, phototherapy devices and other terminal products.

Example 8

This example provides an electrochromic device, which differs from Example 2 in that 160 mg of potassium ferricyanide was weighed out during the preparation of the first electrochromic layer 3, a thickness was 400 nm after spin coating, the maximum charge transfer number per unit area was 16 C/$cm^2$, a thickness of the second electrochromic layer 5 was 250 nm, the maximum charge transfer number per unit area was 10.2 C/$cm^2$, and a ratio of the maximum charge transfer number per unit area of the first electrochromic layer 3 to the maximum charge transfer number per unit area of the second electrochromic layer 5 was 1.57:1.

A reverse voltage (−1.2 V) was applied to the electrochromic device provided in this example for pretreatment, and then, a forward voltage (0.5 V) and a reverse voltage (−0.5 V) were applied alternately, causing that the device color was switched between dark-blue and purple. The electrochromic device provided in this example can be used in consumer electronics, electronic labels, doors and windows, cabinets, wearable devices, smart glasses, phototherapy devices and other terminal products.

Example 9

This example provides an electrochromic device, which differs from Example 3 in that a thickness of the first electrochromic layer 3 was 75 nm, the maximum charge transfer number per unit area was 30 C/$cm^2$, a thickness of the second electrochromic layer 5 was 20 nm, the maximum charge transfer number per unit area was 3 C/$cm^2$, and a ratio of the maximum charge transfer number per unit area of the first electrochromic layer 3 to the maximum charge transfer number per unit area of the second electrochromic layer 5 was 10:1.

A reverse voltage (−3 V) was applied to the electrochromic device provided in this example for pretreatment, and then, a forward voltage (1.5 V) and a reverse voltage (−1.5 V) were applied alternately, causing that the device color was switched between light-gray and blue. The electrochromic device provided in this example can be used in consumer electronics, electronic labels, doors and windows, cabinets, wearable devices, smart glasses, phototherapy devices and other terminal products.

Example 10

This example provides an electrochromic device, the schematic structural diagram of which is shown in FIG. 1, including the first substrate 1, the first transparent conductive layer 2, the first electrochromic layer 3, the electrolyte layer 4, the second electrochromic layer 5, the second transparent conductive layer 6 and the second substrate 7 stacked in sequence; in the device, a material of the first electrochromic layer 3 and a material of the second electrochromic layer 5 were both an anodic electrochromic multicolor material.

A preparation method of the electrochromic device is described below.

1) Preparation of the First Electrochromic Layer 3

A constant-current method was used; 0.1 mol/L of aniline was deposited in 1 mol/L of sulfuric acid solution with 10 μA/$cm^2$ of current density for 30 min, forming the first electrochromic layer 3 (a polyaniline film, with a thickness of 280 nm) on an ITO layer deposited on a glass substrate. The maximum charge transfer number per unit area of the first electrochromic layer 3 was measured, and the result was 20 C/$cm^2$.

2) Preparation of the Second Electrochromic Layer 5

300 mg of $V_2O_5$ flaky crystals were mashed and put into a crucible, heated at 800° C. in a muffle furnace to completely melt into a fluid colloid, kept for 5 min in the temperature and then poured into a bucket for holding colloid, and 20 mL of deionized water was added, and stirred well to obtain a $V_2O_5$ colloidal solution. Subsequently, the obtained solution was dropped onto an ITO layer deposited on a glass substrate, and spin-coated, forming the second electrochromic layer 5 (with a thickness of 350 nm). The maximum charge transfer number per unit area of the second electrochromic layer 5 was measured, and the result was 35 C/$cm^2$, and a ratio of the maximum charge transfer number per unit area of the first electrochromic layer 3 to the maximum charge transfer number per unit area of the second electrochromic layer 5 was 0.57:1.

3) Assembly of the Electrochromic Device 10 wt % of lithium perchlorate, 89.9 wt % of Polymer D precursor and 0.1 wt % of carbonyldiimidazole were mixed and coated on the first electrochromic layer 3, forming an electrolyte coating; then the second electrochromic layer 5 (together with the ITO layer and the glass substrate) was covered on the electrolyte coating in stagger, and the electrolyte coating was subjected to heat curing at 120° C. to form the electrolyte layer 4 (with a thickness of 60 μm), so as to obtain the electrochromic device.

4) Arrangement of Electrodes

The materials of the first electrochromic layer 3 and the second electrochromic layer 5, which were exposed in stagger, were washed with acetone, causing that the first transparent conductive layer 2 and the second transparent conductive layer 6 were exposed, and copper tapes were stuck onto the conductive layers as positive and negative electrodes separately.

This example also provides an electrochromic method for the electrochromic device, including the steps described below.

(1) Performing a Pretreatment by Applying a Forward Voltage

A forward voltage (2.5 V) was applied to the device, causing that the first electrochromic layer 3 was oxidized from green to dark-blue, while the second electrochromic layer 5 still kept yellow color. There is no special limitation on the timing of the pretreatment, and the pretreatment can be performed when the electrochromic device firstly switches between different colors, or it can be performed immediately after the electrode arrangement step of the preparation method for the electrochromic device.

(2) Switch Between Different Colors

A reverse voltage (−1.0 V) was applied to the electrochromic device, causing that the first electrochromic layer 3 was reduced from dark-blue to green, and the second electrochromic layer 5 was oxidized from yellow to gray-black;

a forward voltage (1.2 V) was applied to the electrochromic device, causing that the first electrochromic layer 3 was oxidized from green to dark-blue, and the second electrochromic layer 5 was reduced from gray-black to yellow; the forward voltage (1.2 V) and the reverse voltage (−1.0 V) were applied to the device alternately, so that the device color realized color-switching.

The electrochromic device provided in this example can be used in consumer electronics, electronic labels, doors and windows, cabinets, wearable devices, smart glasses, phototherapy devices and other terminal products.

Example 11

This example provides an electrochromic device, which differs from Example 7 in that 20 mg of poly-2-[(2-ethylhexyloxy)methyl]3,4-thieno1,4-dioxane was weighed out during the preparation of the first electrochromic layer 3, a thickness was 6 nm after spin coating, the maximum charge transfer number per unit area was 0.1 $C/cm^2$, a thickness of the second electrochromic layer 5 was 25 nm, the maximum charge transfer number per unit area was 5 $C/cm^2$, and a ratio of the maximum charge transfer number per unit area of the first electrochromic layer 3 to the maximum charge transfer number per unit area of the second electrochromic layer 5 was 0.02:1.

A forward voltage (1.8 V) was applied to the electrochromic device provided in this example for pretreatment, and then, a reverse voltage (−1.0 V) and a forward voltage (1 V) were applied alternately, causing that the device color was switched between colorless and overlay colors (brown-black and blue-purple).

The electrochromic device provided in this example can be used in consumer electronics, electronic labels, doors and windows, cabinets, wearable devices, smart glasses, phototherapy devices and other terminal products.

Comparative Example 1

The electrochromic device provided in Example 1 was used to perform color-switching, and the method differs from Example 1 in that a forward voltage (1.2 V) and a reverse voltage (−1.2 V) were directly applied to the device for color-changing alternately;

(1) when the forward voltage (1.2 V) was applied to the device, the first electrochromic layer 3 could not lose electrons to undergo an oxidation reaction, the second electrochromic layer 5 could not gain electrons to undergo a reduction reaction, and neither the first electrochromic layer 3 nor the second electrochromic layer 5 could realize color-changing;

(2) when a reverse voltage (−1.2 V) was applied to the device, the first electrochromic layer 3 could not gain electrons to undergo a reduction reaction, the second electrochromic layer 5 could not lose electrons to undergo an oxidation reaction, and neither the first electrochromic layer 3 nor the second electrochromic layer 5 could realize color-changing; and (3) the device color could not be switched by applying the forward voltage (1.2 V) and the reverse voltage (−1.2 V) alternately.

Because the first electrochromic layer 3 and the second electrochromic layer 5 were the anodic electrochromic reduction-state-coloring material, their initial states were both in a reduction state; due to the low potential applied, enough charges could not be provided to cause oxidation discoloration of the material; thus, the device could not realize color-switching.

The applicant has stated that although the specific embodiments of the present application is described above, the protection scope of the present application is not limited to the embodiments, and it should be apparent to those skilled in the art that variations or replacements, which are obvious for those skilled in the art without departing from the technical scope disclosed in the present application, all fall within the protection scope and the disclosure scope of the present application.

What is claimed is:

1. An electrochromic device, comprising:

a first substrate, a first transparent conductive layer, a first electrochromic layer, an electrolyte layer, a second electrochromic layer, a second transparent conductive layer and a second substrate stacked in sequence, wherein;

a material of the first electrochromic layer is poly-2-[(2-ethylhexyloxy)methyl]3,4-thienol,4-dioxane; and a material of the second electrochromic layer is poly (3-hexylthiophene).

2. The electrochromic device according to claim 1, wherein the first transparent conductive layer and the second transparent conductive layer are each composed of at least one of indium tin oxide, aluminum zinc oxide, fluorine doped tin oxide, silver nanowires, graphene, carbon nanotubes, a metal mesh and silver nanoparticles.

3. The electrochromic device according to claim 1, wherein a thickness of the first transparent conductive layer and a thickness of the second transparent conductive layer are each independently 1-1000 nm.

4. The electrochromic device according to claim 1, wherein a maximum charge transfer number per unit area of the first electrochromic layer is 0-35 $C/cm^2$ excluding 0, and a maximum charge transfer number per unit area of the second electrochromic layer is 0-35 $C/cm^2$ excluding 0.

5. The electrochromic device according to claim 1, wherein a ratio of a maximum charge transfer number per unit area of the first electrochromic layer to a maximum charge transfer number per unit area of the second electrochromic layer is 1:50-50:1.

6. The electrochromic device according to claim 1, wherein the electrolyte layer is a gel electrolyte layer, a liquid electrolyte layer or a solid electrolyte layer.

7. The electrochromic device according to claim 6, wherein a thickness of the electrolyte layer is 0.1-200 μm.

8. The electrochromic device according to claim 1, wherein a material of the first substrate and a material of the second substrate are each independently selected from a glass or a flexible material.

9. The electrochromic device according to claim 8, wherein the material of the first substrate and the material of the second substrate are each independently selected from the flexible material; and wherein the flexible material is PET, a cycloolefin copolymer or cellulose triacetate.

10. The electrochromic device according to claim 1, wherein a thickness of the electrolyte layer is 0.1-200 μm.

11. The electrochromic device according to claim 1, wherein a ratio of a maximum charge transfer number per unit area of the first electrochromic layer to a maximum charge transfer number per unit area of the second electrochromic layer is 1:10-10:1.

12. The electrochromic device according to claim 1, wherein the electrolyte layer is a solid polymer electrolyte layer.

13. An electrochromic method for the electrochromic device according to claim 1, comprising the following steps:

(1) applying a second voltage of a second direction to the electrochromic device after pretreatment, wherein the second direction is opposite to a first direction, causing that the first electrochromic layer changes from a third color to a first color, and the second electrochromic layer changes from a second color to a fourth color; the pretreatment comprises: applying a first voltage of the first direction to the electrochromic device, causing that the first electrochromic layer changes from the first color to the third color, and the second electrochromic layer keeps the second color unchanged; and (2) applying a third voltage of the first direction to the electrochromic device after pretreatment, causing that the first electrochromic layer changes from the first color to the third color, and the second electrochromic layer changes from the fourth color to the second color.

14. The electrochromic method according to claim 13, wherein an absolute value of the first voltage is more than or equal to V1, wherein V1 is a threshold voltage for subjecting the second electrochromic layer to an irreversible electrochemical reaction.

15. The electrochromic method according to claim 14, wherein an absolute value of the third voltage is less than the absolute value of the first voltage.

* * * * *